United States Patent
Tracy et al.

(10) Patent No.: US 9,825,807 B2
(45) Date of Patent: Nov. 21, 2017

(54) DETERMINING MULTICAST ROOT NODES IN A TELECOMMUNICATIONS NETWORK

(71) Applicant: Cisco Technology, Inc., San Jose, CA (US)

(72) Inventors: Leonard Tracy, Seattle, WA (US); Santosh Rajagopalan, San Jose, CA (US); Sanjay Sane, Fremont, CA (US); Ronak Desai, Fremont, CA (US); Varun Shah, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 727 days.

(21) Appl. No.: 13/691,043

(22) Filed: Nov. 30, 2012

(65) Prior Publication Data

US 2014/0153437 A1 Jun. 5, 2014

(51) Int. Cl.
*H04L 12/28* (2006.01)
*H04L 12/24* (2006.01)
*H04L 12/761* (2013.01)
*H04L 12/933* (2013.01)
*H04L 12/753* (2013.01)

(52) U.S. Cl.
CPC .............. *H04L 41/08* (2013.01); *H04L 45/16* (2013.01); *H04L 49/15* (2013.01); *H04L 45/48* (2013.01)

(58) Field of Classification Search
CPC ......... H04L 45/48; H04L 45/02; H04L 45/16; H04L 41/08; H04L 49/15; H04W 84/20
USPC .......................... 370/254, 255–256, 351, 401
See application file for complete search history.

(56) References Cited

U.S. PATENT DOCUMENTS

| 7,760,668 B1* | 7/2010 | Zinjuvadia ............. H04L 45/48 370/256 |
| 2004/0179524 A1 | 9/2004 | Sasagawa et al. |
| 2007/0127396 A1 | 6/2007 | Jain et al. |

(Continued)

FOREIGN PATENT DOCUMENTS

WO  WO 2012/075163 A1  6/2012

OTHER PUBLICATIONS

Routing Bridges (RBridges): Base Protocol Specification, RFC 6325, R. Perlman, Jul. 2011, Internet Engineering Task Force (IETF).*

(Continued)

*Primary Examiner* — Harun Chowdhury
(74) *Attorney, Agent, or Firm* — Hickman Palermo Becker Bingham LLP

(57) ABSTRACT

In an embodiment, a method comprises: detecting a change in a multiple-switch configuration in a data communications network comprising a plurality of packet data switches configured as roots of multicast trees. In response to detecting that the multiple-switch configuration has changed, a first value, a second value and a third value representing limits on a number of multicast trees supported in the network and prioritization of the switches are retrieved. The method further comprises determining a type of the multiple-switch configuration change. In response to determining that the type indicates that a first switch was added to the multiple-switch configuration, using at least the first, second and third values, it is determined whether to configure the first switch as a first root in the multiple-switch configuration. The method is performed by one or more computing devices.

21 Claims, 12 Drawing Sheets

(56) References Cited

U.S. PATENT DOCUMENTS

2008/0002693 A1    1/2008  Moki et al.
2010/0061269 A1*  3/2010  Banerjee et al. ............. 370/254
2013/0254356 A1*  9/2013  Eastlake, III ................. 709/220

OTHER PUBLICATIONS

European Patent Office, "Search Report" in application No. PCT/US2013/070836, dated Feb. 4, 2014, 15 pages.
Current European claims in application No. PCT/US2013/070836, dated Feb. 2014, 7 pages.

* cited by examiner

DETERMINING MULTICAST ROOT NODES IN A TELECOMMUNICATIONS NETWORK

TECHNICAL FIELD

The present disclosure is generally related to determining multicast roots in a network, and in particular, to determining multicast tree roots when a multiple-switch configuration in a multi-tier network changes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In current implementations of network protocols, multicast load balancing depends on distribution trees that are calculated based on data describing various nodes in a network. The nodes may have associated tags, and the tags are generally ordered according to some priority scheme. The tags and the priority schemes may be used in selecting tree-roots for the network. The term "tree-root" refers to a root node of a multicast distribution tree. All nodes are a part of the distribution tree.

The priority tags may be assigned to nodes according to the priorities assigned to the nodes. Hence, the highest priority tag is typically assigned to the highest priority node; the second highest priority tag is assigned to the second highest priority node, and so on. However, the node priorities are usually generated and assigned by users, and the users may derive the priorities from pseudo-random values, system identifiers and/or MAC addresses. Therefore, selecting tree-roots based on user-defined priorities rarely allows placing the tree-roots in optimal locations in the network. Instead, such tree-roots may be placed at access switches, which often are sub-optimal nodes for the tree-roots. Further, if the trees are ordered according to the user-defined priorities, a configuration change for a high priority tree-root may cause a change in all lower priority tree-roots. Such changes may be disruptive to communications within the network, and may be detrimental for network convergence.

DETAILED DESCRIPTION OF EXAMPLE EMBODIMENTS

Figure 1:
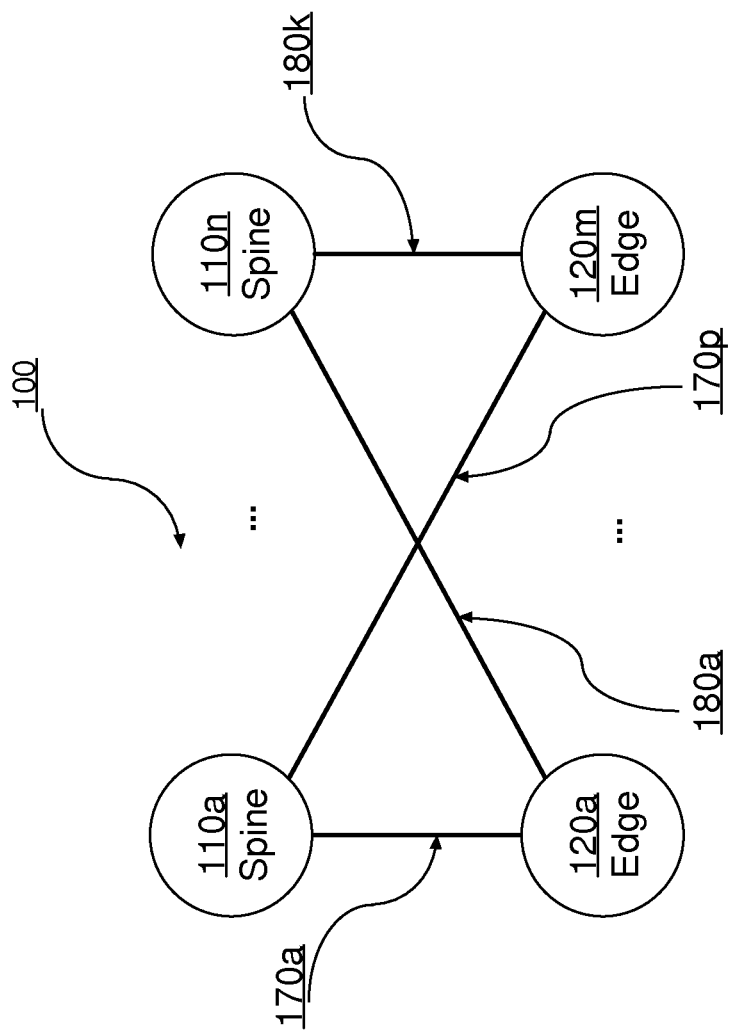
FIG. 1 illustrates an example system for determining multicast roots in a telecommunications network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

The appended claims may serve as a summary of the invention.

A method for determining multicast roots in a telecommunications network is presented. In an embodiment, the method comprises detecting a change in a multiple-switch configuration in a data communications network. The network comprises a plurality of packet data switches, some of which may be configured as roots of multicast trees. In response to detecting that the multiple-switch configuration has changed, a first value, a second value and a third value are retrieved. The values represent limits on a number of multicast trees supported in the network and prioritization schemes for the switches.

In an embodiment, a method further comprises determining a type of the multiple-switch configuration change. In response to determining that the change includes adding a first switch was to the multiple-switch configuration, a determination is made whether to configure the first switch as a first root in the multiple-switch configuration of the network. The determination is made using at least the first, second and third values.

In an embodiment, a method further comprises determining, using at least the first, second and third values, whether to configure a remaining switch of the multiple-switch configuration as a second root.

In response to determining that the change indicates that a second switch was removed from the multiple-switch configuration, a determination is made whether to configure a remaining switch of the multiple-switch configuration as a second root. The determination is made using at least the first, second and third values.

In an embodiment, a method further comprises determining, using at least the first, second and third values, whether to configure a third switch as a third root in the multiple-switch configuration. The determination is made in response to determining that the change indicates that a third priority of the third switch in the multiple-switch configuration has changed.

In an embodiment, the first value indicates a maximum quantity of multi-destination trees that the network supports, the second value indicates a minimum quantity of the multi-destination trees that the network supports, and the third value indicates a minimum priority value used to determine whether a particular node becomes a particular root and is not lesser than an edge default priority value and not greater than a core default priority value.

In an embodiment, a method further comprises updating data in one or more forwarding tables of the switches in response to determining that the first root, the second root or the third root is configured.

In an embodiment, a method further comprises configuring the first switch as the first root in response to determining that a current quantity of roots in the multiple-switch configuration is lesser than the first value, or in response to determining that the current quantity of roots is not lesser than the first value, but a first priority associated with the first switch is higher than any priority of any node in a current set of roots, or in response to determining that the current quantity of roots is lesser than the second value and the first priority associated with the first switch is greater than the third value.

In an embodiment, a method further comprises configuring the remaining switch of the multiple-switch configuration as the second root in response to determining that a current quantity of roots in the multiple-switch configuration is no greater than the first value and a second priority of the remaining switch is not lower than the third value, or in response to determining that the current quantity of roots in the multiple-switch configuration is lesser than the first value and the second priority of the remaining switch is higher than any other priority of any other root in a current set of roots.

In an embodiment, a method further comprises retaining a configuration of the third switch of the multiple-switch configuration as the third root in response to determining that the third switch belongs to a current set of roots and the third priority is not lower than the third value.

In an embodiment, a method further comprises configuring the third switch of the multiple-switch configuration as the third root in response to determining that the third switch did not belong to the current set of roots, the third priority is greater than the third value and there was at least one node in the current set of roots with a priority lower than the third value, or in response to determining that the third switch did not belong to the current set of roots, the third priority is greater than the third value and a current quantity of roots in the multiple-switch configuration is lesser than the second value.

In an embodiment, a method is performed by one or more computing devices.

The foregoing and other features and aspects of the disclosure will become more readily apparent from the following detailed description of various embodiments.

Example Embodiments

Example Structure and Function

Figure 2:
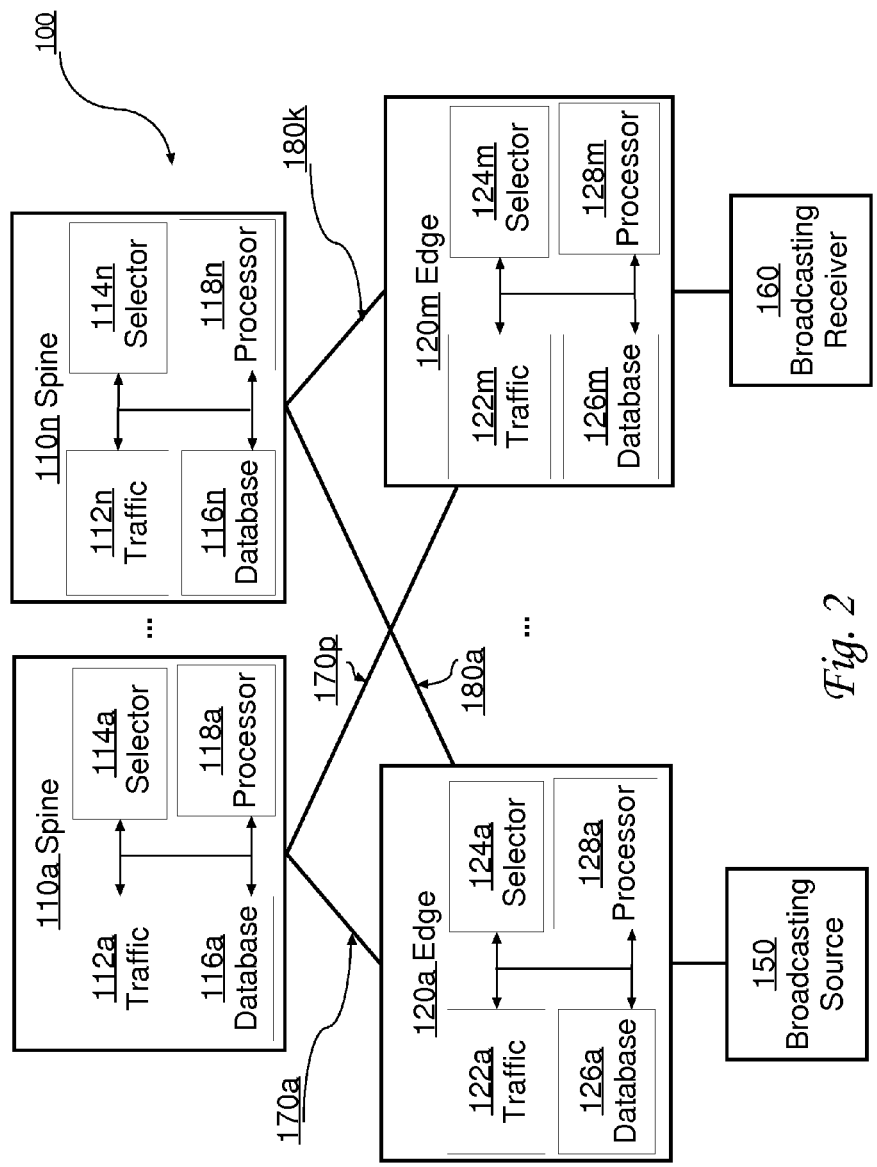
FIG. 2 illustrates an example system for determining multicast roots in a telecommunications network.

FIG. 1 and FIG. 2 each illustrate an example networked computer system 100 for determining multicast roots in a telecommunications network. Nodes in the system may comprise elements of networking infrastructure such as packet data switches, routers and related devices. In some embodiments, nodes comprise network end stations such as computers, workstations, printers, scanners, and similar devices. The system 100 may be viewed as a multi-tier system, in which the nodes are grouped into tiers. Each tier may have any number of nodes, and the data communications network may have more than two tiers of nodes.

For the purpose of illustrating clear examples, in the description below, the terms nodes and switches are used interchangeably. However, the presented approach is applicable to any type of nodes, including switches, routers, hubs and other data routing devices.

The embodiments depicted in FIG. 1 and FIG. 2 illustrate an example system 100 designed based on a two-tier architecture comprising a core tier and an edge tier. Other embodiments may use a first tier and second tier, or other numbers and arrangements of tiers that are denoted using other terms. In an embodiment, core tier nodes may comprise spine switches that are configured to transmit traffic between edge tier nodes, such as access switches. In the embodiments depicted in FIG. 1 and FIG. 2, nodes in the first tier comprise spine switches 110a-110n, and the second tier nodes comprise edge switches 120a-120m. The quantity of nodes in each tier may vary and may depend on implementation.

In an embodiment, spine switches 110a-110n communicate with edge switches 120a-120m. For example, spine switch 110a may communicate with edge switch 120a via a communications link 170a, spine switch 110a may communicate with edge switch 120m via a communications link 170p, spine switch 110n may communicate with edge switch 120a via a communications link 180a, and spine switch 110n may communicate with edge switch 120m via a communications link 180k. Other embodiments may comprise fewer or more communications links 170a-170p and 180a-180k.

In networks that follow the tiered paradigm, identifying core switches that belong to a first tier may be assist in optimizing a data routing process. In conventional approaches, when a node is added to or removed from a network configuration, active nodes in the network execute a tree-root selection process. Hence, the conventional approaches place a great deal of demand on computations resources of each node and on the network bandwidth when the nodes try to determine the new tree-roots, exchange the updated routing information and update their routing tables.

In contrast to conventional approaches, the nodes depicted in FIG. 1, FIG. 2 implement an approach for a tree-root selection process in such a way that the selection process has less impact, and involves fewer updates to the nodes' routing tables. For example, the switches depicted in FIG. 1, FIG. 2 may be configured to select the multi-destination tree roots in a way that is beneficial for optimizing data routing in the network and that facilitates improved convergence of the network.

Certain embodiments may redefine the circumstances under which a tree-root selection process is executed by the nodes, and may provide policies and rules for determining when and how the selection of the roots may be performed. For example, one rule may provide that adding a node to a network does not trigger reselection of the tree-roots. There may be some circumstances in which an addition of a node to the network does not prompt a change in a set of tree-roots determined in the past. Hence, in some circumstances, the nodes may retain their respective sets of tree-roots even if a node is added, or removed. In contrast, in conventional approaches, any change to the network configuration, such as a node addition or removal, usually prompts changes to the set of tree-roots.

Another rule may provide that, once a node is selected as a tree root, that node may remain the root as long as it remains a part of the network. In the presented approach, by allowing a tree root to retain its tree-root role as long as the node remains a part of the network, the nodes do not have to execute the root-selection process as frequently as in conventional networks.

In an embodiment, an approach for tree-root selection utilizes a priority class for nodes. Examples of a priority class may include a core priority class and an edge priority class. A core priority class may be assigned to a node that is configured to act as a core node (a switch, a router, or a hub), while an edge priority class may be assigned to a node that is configured to act as an edge node.

Selection of the priority classes and assignments between the classes and nodes in a data communications network may depend on a variety of factors, including architecture of the data communications network and the quantity of tiers in the network.

FIG. 2 illustrates an example system 100 for determining multicast roots in a telecommunications network. The system 100 comprises spine switches 110a-110n, edge switches 120a-120m, communications links 170a-170p, 180a-180k between the spine switches and the edge switches, at least one broadcasting source 150 and at least one broadcasting receiver 160.

For the purpose of illustrating clear examples, FIG. 2 shows two (2) spine switches 110 and two (2) edge switches 120. However, other embodiments may use any number of spine switches 110 and any number of edge switches 120. Furthermore, for the purpose of illustrating clear examples, FIG. 2, shows that each spine switch 110 is communicatively coupled with each edge switch 120. However, embodiments may use other communications connectivity between the switches. Moreover, FIG. 2 shows one broadcasting source 150 and one broadcasting receiver 160; however, embodiments may comprise additional broadcasting sources 150 and additional broadcasting receivers 160.

Spine switches 110 and edge switches 120 may be implemented in a variety of devices. Examples include switches commercially available from Cisco Systems, Inc., San Jose, Calif.

Spine switches 110 and edge switches 120 are examples of network infrastructure elements that are operable to perform transactional application processing in a distributed environment. As used herein, "network infrastructure element" refers to a networking device that is operable to communicate and/or manage network traffic transmitted in one or more networks. Typically, a network infrastructure element is operable to receive packet flows on network interfaces connected to other network infrastructure elements, make a routing or forwarding decision regarding the received packet flows, and transmit the received packet flows on the network interfaces based on the decision. Examples of network infrastructure elements include, but are not limited to, routers, switches, bridges and hubs. For the purpose of illustrating clear examples, network infrastructure elements 110 are referred herein as spine switches 110, and network infrastructure elements 120 are referred herein as edge switches 120.

As depicted in FIG. 2, in an embodiment, spine switches 110 and edge switches 120 comprise a traffic module 112, a selector module 114, a database 116 and a processor module 118. In some implementations, each switch 110-120 comprises a copy of each of the modules 112-118; in other implementations, some of the switches may comprise some, but not all, modules 112-118. The switches may also comprise some additional modules not identified above. For example, switches 110-120 may comprise other components such as an operating system (OS), a plurality of network interfaces, and other components that are operable to facilitate routing and/or forwarding functionality.

In an embodiment, a traffic module 112, a selector module 114, a database 116 and a processor module 118 may be implemented as one or more software and/or hardware components that are executable under the control of an operating system (OS) of a respective switch. For example, a traffic module 112, a selector module 114, a database 116 and a processor module 118 may be implemented as one or more computer programs or other software components. In some embodiments modules may be implemented in programmable hardware logic.

A traffic module 112 may be configured to receive data communications for other nodes in system 100, process the data communications and forward the data communications toward destinations. Traffic module 112 may implement any type of data communications protocol, including TRILL, VxLAN, NVGRE, MPLS, IP, TCP, BGP and others.

A traffic module 112 may also be configured to receive routing information in a form of advertisements. Once a switch receives an advertisement, traffic module 112, implemented in the switch, may cooperate with other modules to update routing tables that are maintained by the switch and that are used by the switch to forward data.

A traffic module 112 may further be configured to receive information indicating a configuration change in system 100. For example, traffic module 112a, implemented in a spine switch 110a may receive an indication that some other switch in system 100 has failed or otherwise became unresponsive; hence, unable to route the data to other switches. According to another example, traffic module 112a may receive an indication that a new switch has been added to system 100. Furthermore, traffic module 112a may receive an indication that a priority of one of the active switches has been changed.

Upon receiving an indication of a configuration change occurring in system 100, a traffic module 112 may facilitate storing the indication in database 116, and communicate the indication to a selector module 114.

A selector module 114 may be configured to implement a process of determining multicast roots in system 100. For example, upon receiving information of a configuration change in system 100, selector module 114 may parse the received information, determine a type of the configuration change, determine whether the configuration change impacts the selection of tree-roots in system 100, and if so, determine how the configuration change impact the selection of the tree roots. In making the determination, selector module 114 may apply various rules and policies, examples of which are described further herein in connection with FIG. 3A, FIG. 3B, FIG. 3C, FIG. 3D, FIG. 3E, FIG. 3F, FIG. 3G, FIG. 3H.

Determining how a configuration change may impact a selection of tree roots may comprise determining whether any of the switches, currently acting as tree-roots, should be released from the tree-root responsibility. Selection module 114 may execute a process of determining multicast roots for system 100, determine a new or modified set of tree-roots for system 100, and update routing information in its own forwarding tables to reflect the new or modified set of the tree roots.

A selection module 114 may also be configured to determine whether any of the switches, not acting currently as a tree-root, should become a tree-root. In such a case, selection module 114 may execute a process of determining multicast roots, determine a new/modified set of tree-roots, and update routing information in its own forwarding tables to reflect the new/modified set of the tree-roots.

Furthermore, a selection module 113 may be configured to determine that a configuration change does not impact the current selection of the tree-roots at all. For example, in some situation, an addition of a new switch to a network fabric may not necessitate reselection of core switches 110, especially when the sufficient amount of tree-roots has been already selected. Similarly, in some situation, a failure of one tree-root may not necessitate reselection of core switches 110, especially when the sufficient amount of active tree-roots remains.

A database module 116 may be configured to store information in a database. Furthermore, database module 116 may be configured to search the information stored in the database, and to retrieve the information from the database. Database module 116 may be configured as a distributed storage system, a relational database storage system, or any other data storage device known in the industry.

A database module 116 may store, modify and retrieve information indicating a set of the current tree-roots. For example, database module 116 of a switch may receive, from a selector module 114, information about the current tree-roots, store the received tree-root information in the database, and retrieve the tree-root information upon receiving a query from other modules of the switch. According to another example, database module 116 may receive a request to update the tree-root information stored in the database, or receive a request to modify a part of the tree-root information.

Furthermore, a database module 116 may be configured to retrieve routing data for transmitting data between a broadcasting source 150 and a broadcasting receiver 160. For example, a database module 116 may retrieve the routing information from forwarding information tables (FIBs) and routing information tables (RIBs) that a traffic module 112 may use to forward the received data packets toward their destination.

A processor module 118 of a switch may be configured to execute commands and instructions implementing roles assigned to the switch. For example, processor module 118 may facilitate communications to and from the switch, process commands received by and executed by the switch, process responses received by the switch, and facilitate various types of operations executed by the switch. Processor module 118 may comprise hardware and software logic configured to execute various processes on the switch, and use hardware logic such as in an application-specific integrated circuit (ASIC), field-programmable gate array (FPGA), system-on-a-chip (SoC) or other combinations of hardware, firmware and/or software.

A broadcasting source 150 may be configured in a device capable of communicating with one or more edge switches 120 and capable of sending data to one or more broadcasting receivers 160. Broadcasting sources 150 and broadcasting receives 160 may be implemented in any type of computing devices, such as workstations, laptops, PDA devices, smartphones, tablet devices or any other computer devices configured to receive, process and transmit data.

Root Selection after a Switch is Added to a Network

In a multi-switch network using a two-tier architecture, core switches usually transmit data traffic between access switches. Due to the role the core switches play in transmitting the traffic, some of the core switches may become multi-destination tree-roots. Information about the tree-roots is generated and maintained by the switches in the network. The switches may update their tree-root information upon receiving an indication that a network configuration has changed. The approach may be used in determining whether to update the tree-roots information when a network configuration has changed, and whether the switches may retain their previously generated tree-root information as much and as long as possible.

In an embodiment, upon receiving an indication of a change in a multi-switch configuration in a communications network, a switch determines whether the change impacts a current selection of the tree-roots. The change indication may specify for example, that an edge switch or a core switch was added, that some switch was removed from the network, or that a priority of some switch has changed.

A switch may be added to a network fabric when the switch is installed, booted, or if a configuration of the switch is modified in some way. A switch may be removed from the network when the switch fails to operate, the switch is shut down, or the switch configuration is modified. A priority of the switch may be changed by modifying the configuration of the switch.

In two-tier networks, comprising core switches and edge switches, two priority classes may be identified: a core priority class and an edge priority class. In such networks, a switch that is assigned a core switch role has usually associated a core priority class, while a switch that is assigned an edge switch role has usually associated an edge priority class. A priority class may be assigned to a switch automatically during the switch installation, a boot-up process of the switch, or during the switch reconfiguration. The class may be assigned automatically or manually.

Assigning a priority class to a switch may be performed according to rules. The rules may provide constraints for determining whether the switch may become a core switch or an edge switch. For example, a switch may have assigned a core priority class, and thus become a core switch, if no edge ports are configured on the switch. In contrast, a switch may have assigned an edge priority class, and thus become an edge switch, if one or more edge ports are configured on the switch.

A priority class may be assigned to a switch by assigning a priority class identifier. Alternatively, a priority class may be indicated by a priority class value. A priority class value may be selected based on a quantity of the edge ports identifiable on the switch, or in any other way.

Additional rules and constraints may be applicable to determining a priority class value for a switch. For example, one rule may provide that a priority class value for a core switch should fall within a range of priorities for core switches, and a priority class value for an edge switch should fall within a range of priorities for edge switches.

Adding a switch to a network fabric may spur a surge of advertisements containing indications that the new switch was added. The indications are disseminated to all switches in the network, and a switch that received the indication determines an impact that the switch addition may have on the selection of tree-roots. The determination may be made based on the information provided in the indication and various settings implemented in the network. For example, a switch may parse the received advertisement, extract the indication information, and analyze the indication information to determine a type of the added switch, a priority class of the added switch, and other parameter values.

Upon receiving an indication that a new switch was added, a receiving switch may examine a priority class value of the added switch to determine a role that the new switch has been assigned. For example, the receiving switch may try to determine whether the priority class value of the added switch falls within a priority class value range typical for a core switch, or falls within a priority class value range typical for an edge switch.

Alternatively, a switch that received an indication that a new switch was added to a network may try to determine a role that the added switch has been assigned by comparing the switch priority class value with a core default priority value and an edge priority value. The terms CoreDefPrio and EdgeDefPrio may be used as shorthand to refer, respectively, to the core default priority value and edge default priority value. A CoreDefPrio indicates a default priority class value for a core switch, while an EdgeDefPrio value indicates a default priority class value for an edge switch. Typically, a CoreDefPrio value is greater than EdgeDefPrio value. Both CoreDefPrio and EdgeDefPrio values may be defined per topology. Thus, in a network that provides support for multiple topologies, multiple sets of CoreDefPrio and EdgeDefPrio may be defined.

In some implementations, an EdgeDefPrio value may be set to a default value of "64," while a CoreDefPrio value may be set to a default value of "100." Hence, if the priority class value of an added switch is greater than or equal to a CoreDefPrio value, then, most likely, the added switch is a core switch. On the other hand, if the priority class value of the added switch is lower than a CoreDefPrio value, but greater than or equal to an EdgeDefPrio value, than, most likely, the added switch is an edge switch.

Additional parameters that a switch may use in determining an impact that a switch addition may have on the selection of tree-roots may comprise a MaxVarTrees parameter, a MinVarTrees parameter and a MinVarPrio. MaxVarTrees and MinVarTrees may correspond to similarly named parameters as now known in FabricPath networks or Trill networks so that MaxVarTrees indicates a maximum number of supported multi-destination trees in the network and MinVarTrees indicates a minimum number of trees that the network supports. The term MinVarPrio may be used as shorthand to refer to a value that indicates a minimum priority for a switch to become a tree-root. The values of MaxVarTrees, MinVarTrees and MinVarPrio may be initialized automatically or upon a request in various embodiments. In an embodiment, MinVarTrees and MaxVarTrees are typically set to "2."

A MinVarPrio value may be set to any root priority, and may be chosen in such a way that it is greater than an EdgeDefPrio value, but lesser than (or equal to) a CoreDefPrio value. For example, in some implementations, an EdgeDefPrio value may be set to "70," a CoreDefPrio value may be set to "100," and a MinVarPrio value may be set to "80." In other implementations, other default values may be associated with EdgeDefPrio, CoreDefPrio and MinVarPrio, respectively. The default values may be reconfigurable; however, if the default values are reconfigured on one switch, it is recommended that the default values be reconfigured consistently throughout the network.

Priority class values, MinVarPrio, MaxVarTrees, MinVarTrees and other parameters may be used to determine whether, in response to receiving an indication that a switch was added to a network fabric, a set of tree-roots may be modified. For example, upon receiving the indication, using EdgeDefPrio and CoreDefPrio, an indication-receiving switch may determine whether the added switch is an edge switch or a core switch, and then, using MinVarPrio, MinVarTrees and MaxVarTrees, the indication-receiving switch may determine whether the added switch may become a tree-root. In particular, if it is determined that the added switch is a core switch, and a current set of tree-roots is insufficient to support the currently established network trees, then, most likely, the added switch may become a tree-root, and the current set of tree-roots may be modified to include the added switch in the set of tree-roots. This simplified rule is described merely for the purpose of illustration of a simple example. More comprehensive rules are described below in FIG. 3A, FIG. 3B, FIG. 3C, FIG. 3D.

FIG. 3A, FIG. 3B, FIG. 3C, FIG. 3D illustrate an example method for determining multicast roots in a telecommunications network after a switch was added to the network. Other embodiments may implement other rules in ways different from FIG. 3A, FIG. 3B, FIG. 3C, FIG. 3D. The rule examples depicted in FIG. 3A, FIG. 3B, FIG. 3C, FIG. 3D illustrate the embodiments of networks in which MinVarTrees and MaxVarTrees are set to "2," indicating that the network supports two multi-destination trees.

Rule examples described herein may be extended to the networks that support more than two multi-destination trees. Further, the rules may be extended to accommodate the tree-root selection process for the networks whose architectures include more than two tiers.

In FIG. 3A, FIG. 3B, FIG. 3C, FIG. 3D, a network configuration 300a depicts a network configuration established prior to adding a new switch, while a network configuration 300b depicts a network configuration established after the new switch was added. Thus each of FIG. 3A, FIG. 3B, FIG. 3C, FIG. 3D illustrates how adding a new switch changes the network configuration 300a to the network configuration 300b.

The tree-roots are depicted as located above edge switches. For example, in FIG. 3A, a network configuration 300b comprises a new switch 301 acting as a tree-root, and thus the new switch 301 is depicted as located above an edge switch 120a, which acts as an edge switch.

Figure 3A:
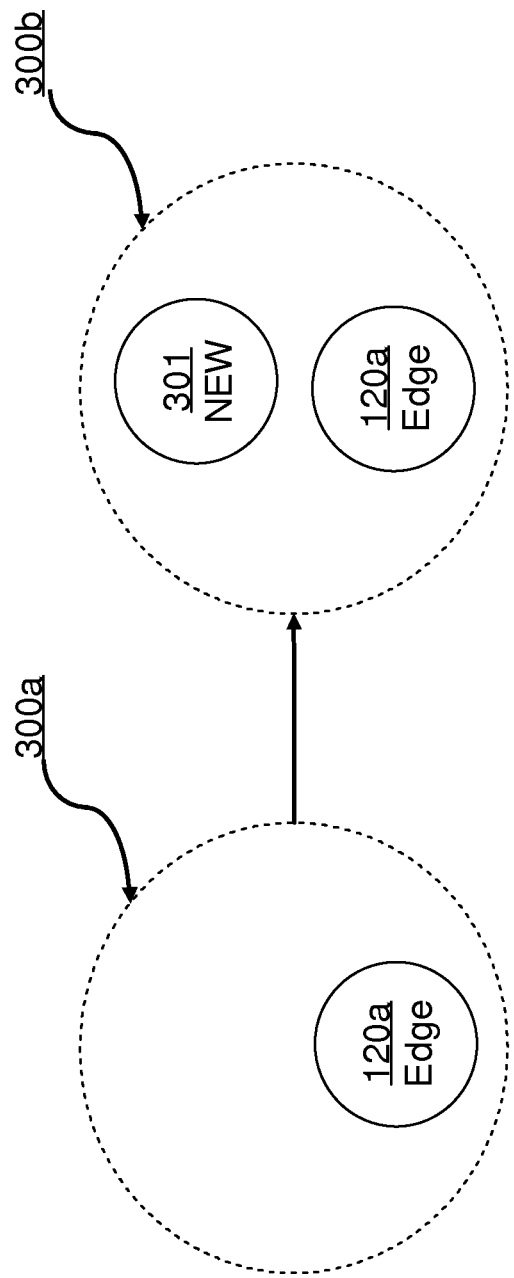
FIG. 3A illustrates an example method for determining multicast roots in a telecommunications network after a switch was added to the network.

FIG. 3A illustrates an example method for determining multicast tree-roots in a telecommunications network after a new switch 301 was added to an edge switch 120a in a network. A network configuration 300a illustrates the network configuration that was established prior to adding the new switch 301, while a network configuration 300b illustrates the network configuration that is established after the new switch 301 was added to the network Prior to adding a new switch 301, a network configuration 300a comprises an edge switch 120a. However, after the new switch 301 was added to the network, the network configuration 300a transitions to a network configuration 300b, which comprises not only the edge switch 120a, but also the new switch 301. Once the new switch 301 was added, the switches in the network may determine whether the new switch 301 may act as a tree-root, and if so, how to include the new switch 301 into a set of the tree-roots in a least intrusive way.

In response to receiving an indication that a new switch 301 was added to a network, the switches in the network determine whether adding the new switch 301 impacts in any way an existing set of multi-destination tree-roots in the network. The determination may be made by applying one or more rules. An example of such a rule may be phrased as follows:

RULE 1A

If, after adding a new switch to a network, the network has less than MinVarTrees tree-roots, then the new switch becomes a tree-root.

Logical rules such as Rule 1A may be implemented using any suitable form of computing logic including one or more computer programs, other software elements, or programmed hardware logic. In the example depicted in FIG.

3A, it is assumed that MinVarTrees value is "2." After adding a new switch 301, a network configuration 300a, which comprised only an edge switch 120a, transitioned to a network configuration 300b. Since there was less than MinVarTrees tree-roots, after the new edge switch 301 was added, the new switch 301 may become a root. The resulting configuration 300b comprises the edge switch 120a, acting as an edge, and the new switch 301, acting as a tree-root. Since the new switch 301 may become a tree-root, the switches may modify their respective sets of tree-roots to reflect the addition of the switch 301 as a root.

In an embodiment, the modifications to a set of tree-roots may be less time consuming and less computationally taxing on the switches than in the conventional networks, which may modify the root sets even though the required number of roots are elected. According to the present approach, the switches will retain the current tree-root assignments as closely as possible, and update the set of tree-root by merely adding a switch 301 as a root to the set of the tree-roots.

Figure 3B:
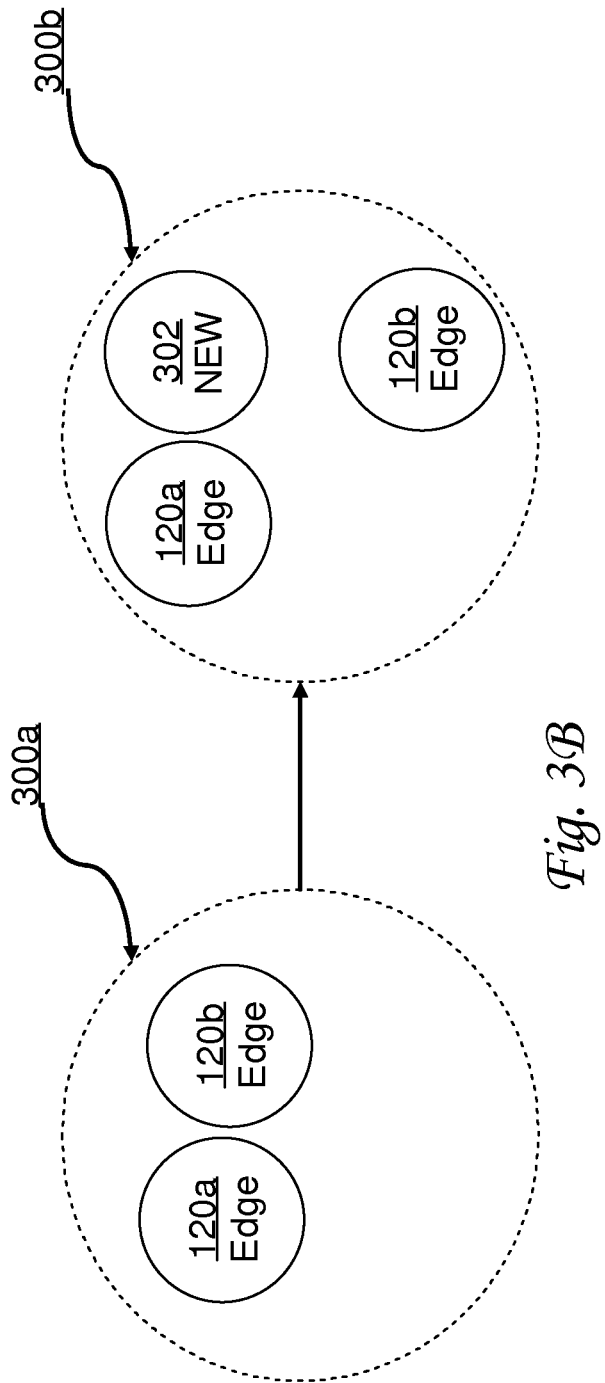
FIG. 3B illustrates an example method for determining multicast roots in a telecommunications network after a switch was added to the network.

FIG. 3B illustrates an example method for determining multicast tree-roots in a telecommunications network after a new switch 302 was added to two edge switches 120a-120b in the network. A network configuration 300a illustrates the network configuration that was established prior to adding the new switch 302, and that included two edge switches 120a-120b, while a network configuration 300b illustrates the network configuration that is established after the new switch 302 was added to the network, and that includes the edge switches 120a-120b and the new switch 302.

In response to receiving an indication that a new switch 302 was added to a network, the switches in the network determine whether adding the new switch 302 impacts in any way an existing set of multi-destination tree-roots for the network. In the scenario depicted in FIG. 3B, the determination may be made based on the following rule:

RULE 1B

If, after adding a new switch to a network, the network has at least MinVarTrees nodes, a priority class value of the new switch is greater than or equal to MinVarPrio and a priority class value of a current lowest priority root is lower than MinVarPrio, then the new switch replaces the current lowest priority root.

In the example depicted in FIG. 3B, it is assumed that MinVarTrees value is "2," a priority class value of an edge switch 120a is "64," a priority class value of an edge switch 120b is "65," a priority class value of the new switch is "95," and MinVarPrio is "90." Prior to adding the new switch 302, a network configuration 300a comprised two edge switches 120a-120b, acting as roots, and the edge switch 120b was the current lowest priority node. The network had at least MinVarTrees nodes. After the new edge switch 302 was added, the new switch 302 becomes a root and replaces the current lowest priority node 120b because "64"<"90" and "95">"90." Therefore, a network configuration 300b depicts the new switch 302 as located along the side with the edge switch 120a, both acting as tree-roots, and located above the edge switch 120b, which now acts as an edge switch.

The switches may update their respective sets of tree-roots by adding the new switch 302 as a tree-root, and retaining information for the remaining tree-root 120a.

Figure 3C:
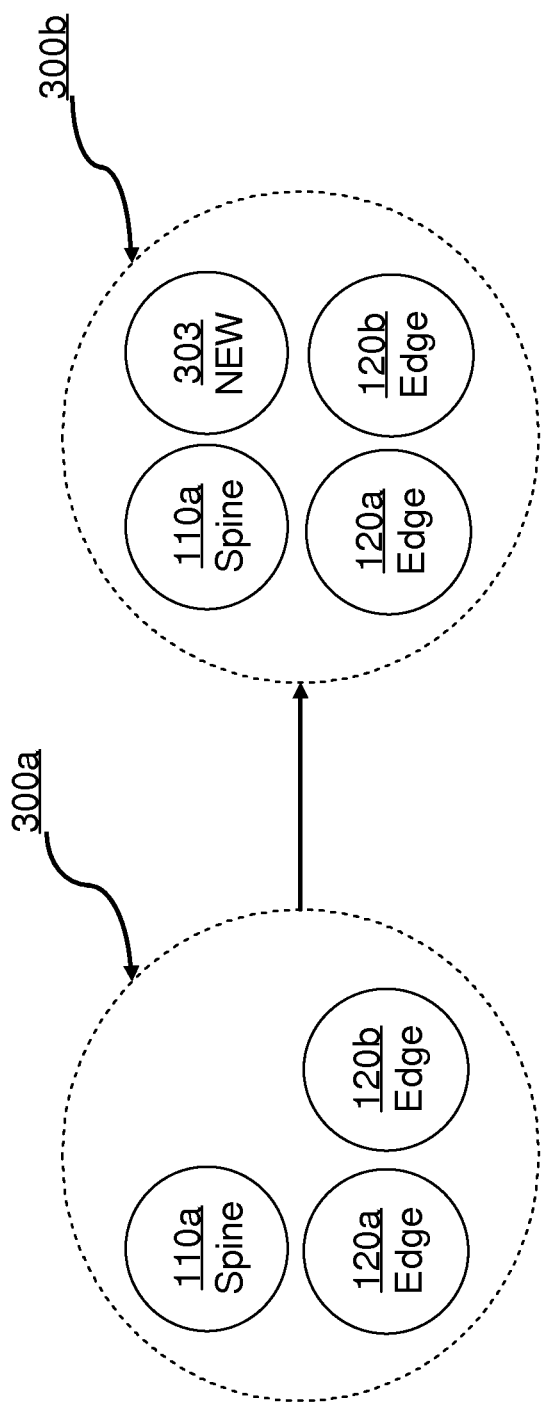
FIG. 3C illustrates an example method for determining multicast roots in a telecommunications network after a switch was added to the network.

FIG. 3C illustrates an example method for determining multicast tree-roots in a telecommunications network after a new switch 303 was added to a network comprising a spine (tree-root) switch 110a and two edge switches 120a-120b. A network configuration 300a illustrates the network configuration that was established prior to adding the new switch 302, and that included the spine switch 110a and two edge switches 120a-120b, while a network configuration 300b illustrates the network configuration that is established after the new switch 302 was added to the network, and that includes the spine switch 110a, two edge switches 120a-120b and the new switch 302.

In response to receiving an indication that a new switch 303 was added to a network, the switches in the network determine whether adding the new switch 303 impacts in any way an existing set of multi-destination tree-roots in the network. In the scenario depicted in FIG. 3C, the determination may be made based on the following rule:

RULE 1C

If, after adding a new switch to a network, the network had less than MaxVarTrees tree-roots (but at least one tree-root), then the new switch becomes a tree-root if a priority class value of the new switch is greater than or equal to MinVarPrio.

In the example depicted in FIG. 3C, it is assumed that MaxVarTrees value is "2," a priority class value of the new switch is "95," and MinVarPrio is "90." Prior to adding the new switch 303, a network configuration 300a comprised two edge switches 120a-120b, acting as edges, and a spine switch 110a acting as a tree-root. The network had at least one root, but less than MaxVarTrees roots. After the new edge switch 303 was added, the new switch 303 becomes a root because there was less than MaxVarTrees roots, and "95">"90." Therefore, a network configuration 300b depicts the new switch 303 as located along the side with the spine switch 110a, but above the edge switches 120a-120b.

The switches may update their respective sets of tree-roots by adding the new switch 303 as a tree-root to their respective sets of tree-roots. The modification will merely comprise adding the new switch 303 to the set of the tree-roots, and retaining the remaining information in the sets.

In an embodiment, if upon adding a new switch to a network fabric, none of the Rules 1A-1C may be applied, then the new switch may not become a root. For example, if MaxVarTrees=MinVarTrees="2," but the network already had two tree-roots, and each of the existing tree-roots had a priority class value greater than MinVarPrio, then the new switch will not become a tree-root even if the new switch has a priority class value greater than MinVarPrio. Instead, the switches accept the new switch as an edge switch, not as a tree root. Further, the switches will retain their respective sets of tree-roots, and make no modifications to the sets.

Figure 3D:
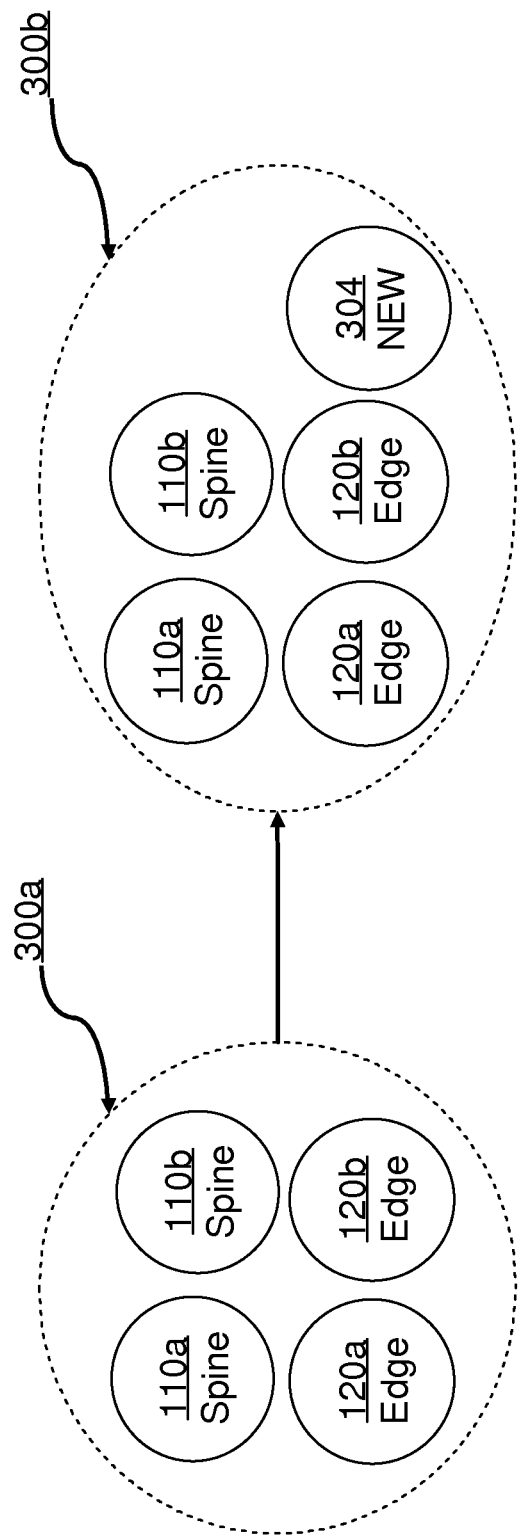
FIG. 3D illustrates an example method for determining multicast roots in a telecommunications network after a switch was added to the network.

Another example scenario in which none of the Rules 1A-1C applies is depicted in FIG. 3D. In FIG. 3D, it is assumed that MaxVarTrees=MinVarTrees="2," spine switches 110a-110b act as tree-roots, and a new switch 304, added to the network, has a priority class value lower than MinVarPrio. A network configuration 300a illustrates the network configuration that was established prior to adding the new switch 304, and that included two spine switches 110a-110b and two edge switches 120a-120b, while a network configuration 300b illustrates the network configuration that is established after the new switch 304 was added to the network and that includes two spine switches 110a-110b, three edge switches 120a-120b and 304.

Because a priority class value of the new switch 304 in FIG. 3D is lower than MinVarPrio, Rule 1B does not apply to the scenario depicted in FIG. 1D. Rule 1A does not apply either because the network already has more than MinVarTrees roots. Rule 1C does not apply because the network has MaxVarTrees roots. Therefore, none of Rules 1A-1C can be applied to the scenario depicted in FIG. 1D. New switch 204 may belong to the core set as well. That depends on the switch priority. Further, there is no need for the switches to modify their respective sets of tree-roots; the switches may retain their previously created sets of the tree-roots.

Root Selection after a Switch was Removed from a Network

In an embodiment, upon receiving an indication of a change in a multi-switch configuration in a communications network, a switch determines whether the change impacts a selection of the tree-roots. The change indication may specify for example, that one of switches has been removed from the network. The presented approach is directed to minimizing the occurrences of reselection of the tree-roots when a switch was removed from the network; however, if the reselection is performed, the scope of the modification to a current set of tree-roots may be minimized.

A switch may be removed from a network fabric when the switch fails, when the switch is shut down, when the switch is reconfigured, or when the switch is undergoing maintenance or other type of repairs.

Figure 3E:
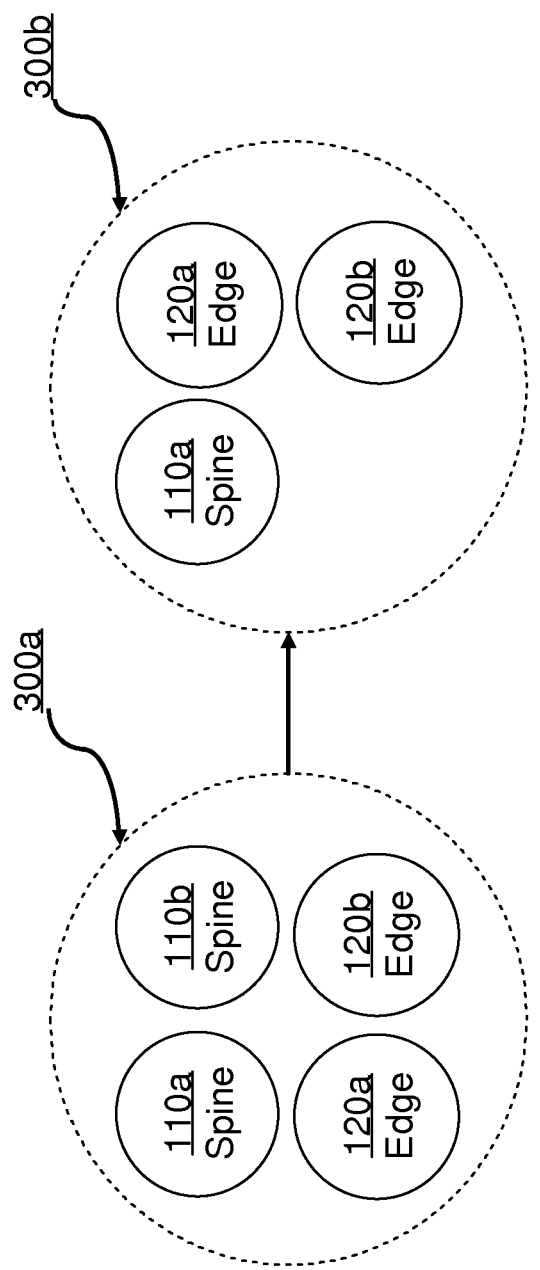
FIG. 3E illustrates an example method for determining multicast roots in a telecommunications network after a switch was removed from the network.

The drawing figures also illustrate an example method for determining multicast roots in a telecommunications network after a switch was removed from the network. In particular, FIG. 3E illustrates an example method for determining multicast tree-roots in a telecommunications network after a spine switch 110b was removed from the network. A network configuration 300a illustrates the network configuration that was established prior to removing the spine switch 110b, and that included two spine switches 110a-110b and two edge switches 120a-120b, while a network configuration 300b illustrates the network configuration that is established after the spine switch 110b has been removed from the network, and that includes a spine switch 110a and an edge switch 120a, both acting as tree-roots, and an edge switch 120b acting as an edge.

In response to receiving an indication that spine switch 110b was removed from a network, the switches in the network determine whether removing spine switch 110b impacts in any way a current set of multi-destination tree-roots for the network. In the scenario depicted in FIG. 3E, the determination may be made based on the following rule:

RULE 2A
If, after removing a tree-root from a network, the network has at least MinVarTrees tree-roots and a priority value of the highest-priority non-root is greater than or equal to MinVarPrio, then the highest priority non-root becomes a tree-root.

In the example depicted in FIG. 3E, it is assumed that the MinVarTrees value is "2," a priority class value of an edge switch 120a is "95," a priority class value of an edge switch 120b is "94," and MinVarPrio is "90." Prior to removing a spine switch 110b, a network configuration 300a comprised two spine switches 110a-110b, both acting as tree-roots, and two edge switches 120a-120b, both acting as non-roots. After the spine switch 110b was removed, the network has a spine switch 110a acting as a tree-root. If switch 110b was a root, and now it is removed, then there is only one root left (since MinVarTrees is "2"). However, because the edge switch 120a has a priority value that is greater than MinVarPrio ("95">"90"), the edge switch 120a becomes a root. Therefore, a network configuration 300b depicts the edge switch 120a as located along the side with the spine switch 110a, both acting as tree-roots, but located above the edge switch 120b, which acts as an edge.

The switches may update their respective sets of tree-roots by removing the spine switch 110b from a set of tree-roots, and adding the edge switch 120a to the set. No modification is prompted to the set of tree-roots with respect to the spine switch 110a, which remains a tree-root.

Figure 3F:
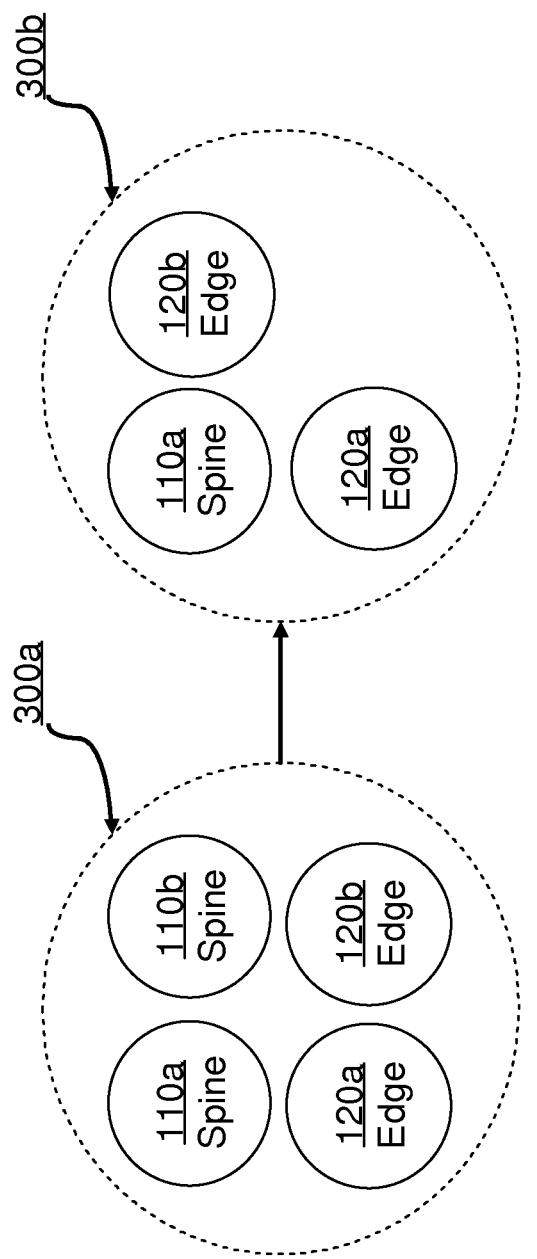
FIG. 3F illustrates an example method for determining multicast roots in a telecommunications network after a switch was removed from the network.

FIG. 3F illustrates an example method for determining multicast tree-roots in a telecommunications network after a spine switch 110b was removed from a network. A network configuration 300a illustrates the network configuration that was established prior to removing the spine switch 110b, and that included two spine switches 110a-110b, both acting as tree-roots, and two edge switches 120a-120b, both acting as edge switches. A network configuration 300b illustrates the network configuration that is established after the spine switch 110b was removed from the network, and that includes the spine switch 110a and an edge switch 120b, both acting as tree-roots, and an edge switch 120a, acting as an non-root.

In response to receiving an indication that spine switch 110b was removed from a network, the switches in the network determine whether removing the spine switch 110b impacts in any way an existing set of multi-destination tree-roots for the network. In the scenario depicted in FIG. 3F, the determination may be made based on the following rule:

RULE 2B
If, after removing a tree-root from a network, the network has less than MinVarTrees tree-roots, then the highest priority non-root becomes a tree-root.

In the example depicted in FIG. 3E, it is assumed that MinVarTrees value is "2," a priority class value of an edge switch 120a is "94," a priority class value of an edge switch 120b is "95," and MinVarPrio is "90." Prior to removing a spine switch 110b, a network configuration 300a comprised two spine switches 110a-110b, both acting as tree-roots, and two edge switches 120a-120b, both acting as non-roots. After the spine switch 110b was removed, the edge switch 120b became a root because otherwise there would be less than MinVarTrees tree-roots and because the edge switch 120b was the highest priority non-root. Therefore, a network configuration 300b depicts the edge switch 120b as located along the side with the spine switch 110a, both acting as tree-roots, but also located above the edge switch 120a, which acts as an edge. The switches will update their respective sets of tree-roots by removing the spine switch 110b from a set of tree-roots, and adding the edge switch 120b to the set.

Root Selection after a Priority of a Switch Changed

In an embodiment, a received indication may specify that one of the switches in the network changed its own priority class value. Upon receiving the change indication, a switch in the network determines whether the change impacts a selection of the tree-roots.

A switch may change its priority class value when the switch is reconfigured, or when the switch is undergoing maintenance or other type of repairs.

Figure 3G:
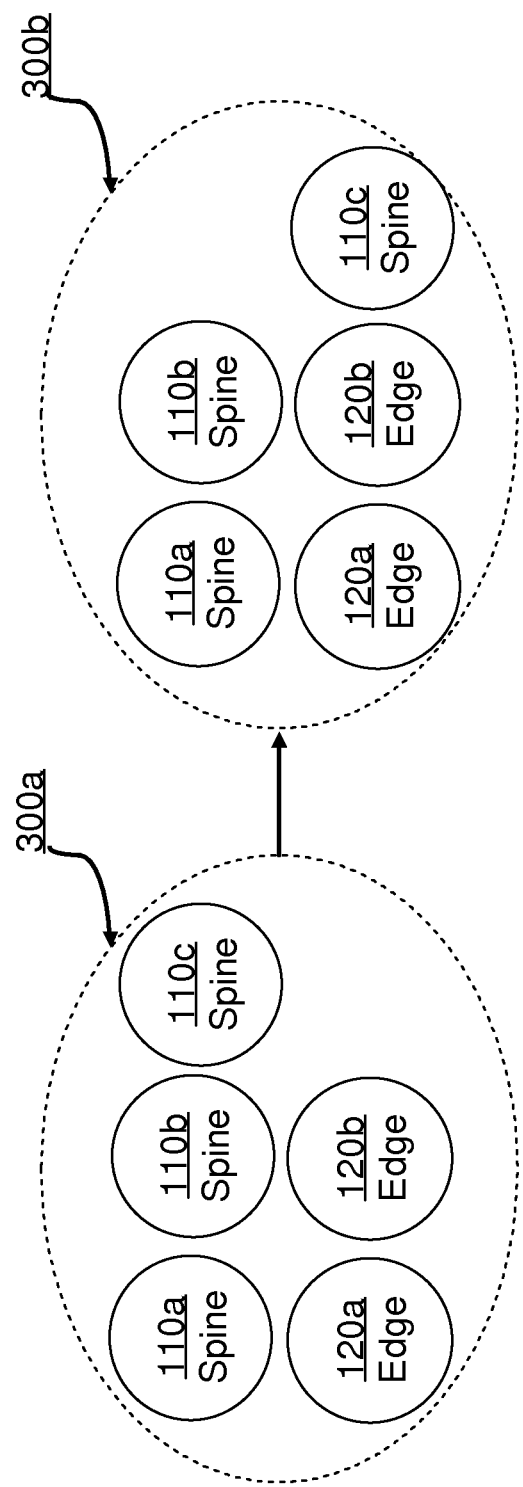
FIG. 3G illustrates an example method for determining multicast roots in a telecommunications network after a priority of a switch was changed.
Figure 3H:
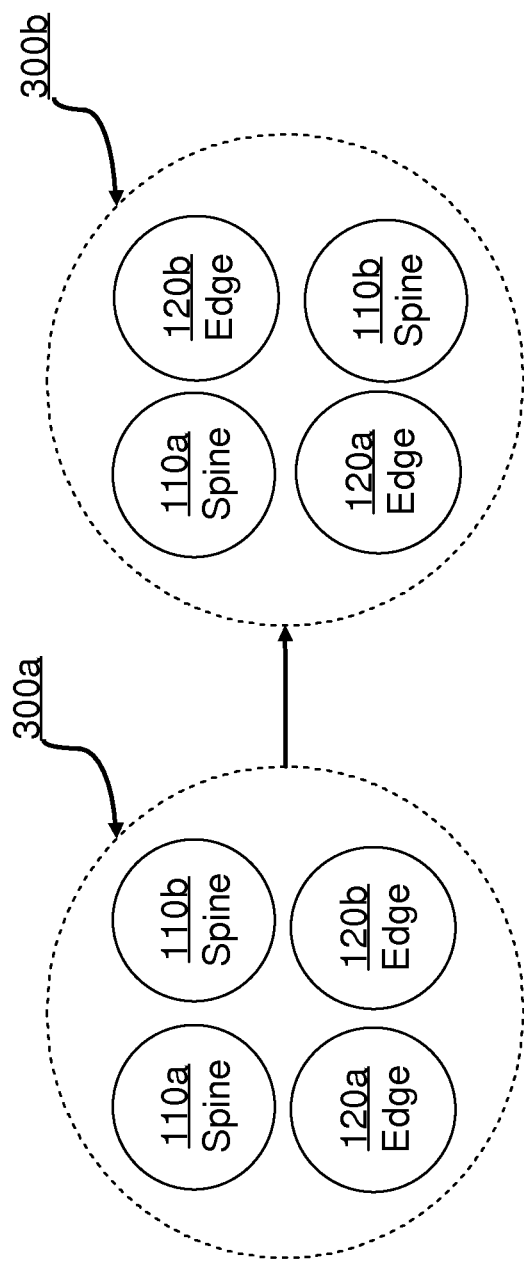
FIG. 3H illustrates an example method for determining multicast roots in a telecommunications network after a priority of a switch was changed.

FIG. 3G and FIG. 3H illustrate an example method for determining multicast roots in a telecommunications network after a priority of a switch has been changed. In particular, FIG. 3G illustrate an example method for determining multicast tree-roots in a telecommunications network after a priority class value of a spine switch 110c was changed. A network configuration 300a illustrates the network configuration that was established prior to changing the priority class value of the spine switch 110c, and that included three spine switches 110a-110c and two edge switches 120a-120b, while a network configuration 300b illustrates the network configuration that is established after the priority class value of the spine switch 110c was changed, and that includes two spine switches 120a-120b, acting as tree-roots, and edge switches 120a-120b and the spine switch 110c, all three acting as edges.

In response to receiving an indication that a priority class value of a spine switch 110c has been changed, the switches in the network determine whether the change impacts in any way a current set of multi-destination tree-roots for the network. In the scenario depicted in FIG. 3G, the determination may be made based on the following rule:

RULE 3A

If the affected switch is a current root, then the affected switch is no longer a tree-root only if, after the priority change of the affected switch there are still at least MinVarPrio tree-roots and a new priority class value of the affected switch is lower than MinVarPrio.

In the example depicted in FIG. 3G, it is assumed that MinVarTrees value is "2," a new priority class value of a spine switch 110c is "80," and MinVarPrio is "90." Prior to a priority change of the spine switch 110c, a network configuration 300a comprised three spine switches 110a-110c, all three acting as tree-roots, and two edge switches 120a-120b, both acting as non-roots. After the priority change of the spine switch 110c, a network configuration 300b comprises two spine switches 110-120b, both acting as tree-roots, and two edge switches 120a-120b and the spine switch 110b, all three acting as non-roots. Since the new priority class value of the spine switch 110c is lower than MinVarPrio ("80"<"90") and after the priority change of the spine switch 110c there are still at least MinVarPrio tree-roots, the spine switch 110c is no longer a tree-root. Therefore, a network configuration 300b depicts the spine switch 110c as a non-root node. It is located along the side with the edge switches 120a-120b, and located below the spine switches 110a-110b.

The switches may update their respective sets of tree-roots by removing the spine switch 110c from a set of tree-roots. No modification is prompted to the set of tree-roots with respect to the spine switches 110a-110b, which remain tree-roots.

If at least one condition included in the Rule 3A is not satisfied, then the spine switch 110c could remain a tree-root. For example, if a new priority class value of the spine switch was greater than or equal to MinVarPrio, then the spine switch 110c would remain a tree-root.

FIG. 3H illustrates an example method for determining multicast tree-roots in a telecommunications network after a priority class value of an edge switch 120b has changed. In FIG. 3H, it assumed that a priority class value of an edge switch 120b was increased. A network configuration 300a illustrates the network configuration that was established prior to increasing the priority class value of the edge switch 120b, and that included two spine switches 110a-110b and two edge switches 120a-120b, while a network configuration 300b illustrates the network configuration that is established after the priority class value of the edge switch 120b was increased, and that includes two spine switches 120a-120b, and two edge switches 120a-120b, wherein both the spine switch 110a and the edge switch 120b act as tree-roots, and both the edge switch 120a and the spine switch 110b act as edges.

In response to receiving an indication that a priority class value of an edge switch 120b has been changed, the switches in the network determine whether the change impacts in any way a current set of multi-destination tree-roots for the network. In the scenario depicted in FIG. 3H, the determination may be made based on the following rule:

RULE 3B

If an affected switch is not a current root, then the affected switch becomes a tree-root only if at least one of two conditions is satisfied: (a) if a new priority of the affected switch is greater than MinVarPrio, and there was a tree-root whose priority is lower than MinVarPrio, then the affected switch becomes a tree-root and the tree-root whose priority was lower than MinVarPrio is no longer a tree-root, and (b) if, the new priority of the affected switch is greater than MinVarPrio and there was lower than MaxVarTrees tree-roots, then the affected switch becomes a tree-root.

In the example depicted in FIG. 3H, it is assumed that MinVarTrees value is "2," MinVarTrees value is "2," a new priority class value of an edge switch 120b is "95," a priority class value of a spine switch 110b is "80," and MinVarPrio is "90." Prior to a priority change of the edge switch 120b, a network configuration 300a comprised two spine switches 110a-110b, both acting as tree-roots, and two edge switches 120a-120b, both acting as non-roots. After the priority change of the edge switch 120b, a network configuration 300b comprises two spine switches 110-120b, and two edge switches 120a-120b; however, the spine switch 110a and the edge switch 120b are both acting as tree-roots, and the edge switch 120a and the spine switch 110b are both acting as non-roots.

Since the new priority class value of the edge switch 120b is greater than MinVarPrio ("95">"90"), and a priority class value of the spine switch 110b is lower than MinVarPrio ("80"<"90"), the edge switch 120b becomes a tree-root, while the spine switch 110b becomes a non-root. Therefore, a network configuration 300b depicts the spine switch 110b as a non-root. The spine switch 110b is depicted as located along the side with the edge switch 120a, and located below the spine switch 110a and the edge switch 120b.

The switches may update their respective sets of tree-roots by removing the spine switch 110b from a set of tree-roots, and adding the edge switch 120b to the set of tree-roots. No modification is prompted to the set of tree-roots with respect to the spine switch 110a, which remains a tree-root.

If none of the conditions specified in the Rule 3B is satisfied, then the spine switch 110c could remain a tree-root. For example, if a new priority class value of the spine switch is greater than or equal to MinVarPrio, then the spine switch 110c would remain a tree-root.

One of the benefits of the presented approach is that an FTAG may remain associated with a root as long as the root remains active. Hence, according to the presented approach, the number of times a set of tree-roots is modified or regenerated may be smaller than in conventional networks. Therefore, the network "churn" and multicast convergence times in the network may be reduced. For example, once a switch becomes a tree-root, a forwarding tag (FTAG) is assigned to the switch. The FTAG may remain assigned to the root switch as long as the switch acts as a root. However, if, due to the switch failure or due to other reasons, the switch becomes unsuitable to act as a tree-root and there is no suitable replacement for the root-switch, then the FTAG may become unused until a new root is identified. When a new root is identified and assigned a role of a tree-root, the lowest unused FTAG allocated for the topology is retrieved and assigned to the new root. In a situation when two or more networks merge into one network, broadcast roots with the highest priority will preserve their own FTAGs.

Furthermore, because in selecting tree-roots a preferential treatment may be given to the core switches, selecting the tree-roots primarily from the core switches may facilitate more optimal data forwarding than in conventional networks.

Determining Multicast Tree-Roots in a Network

Figure 4:
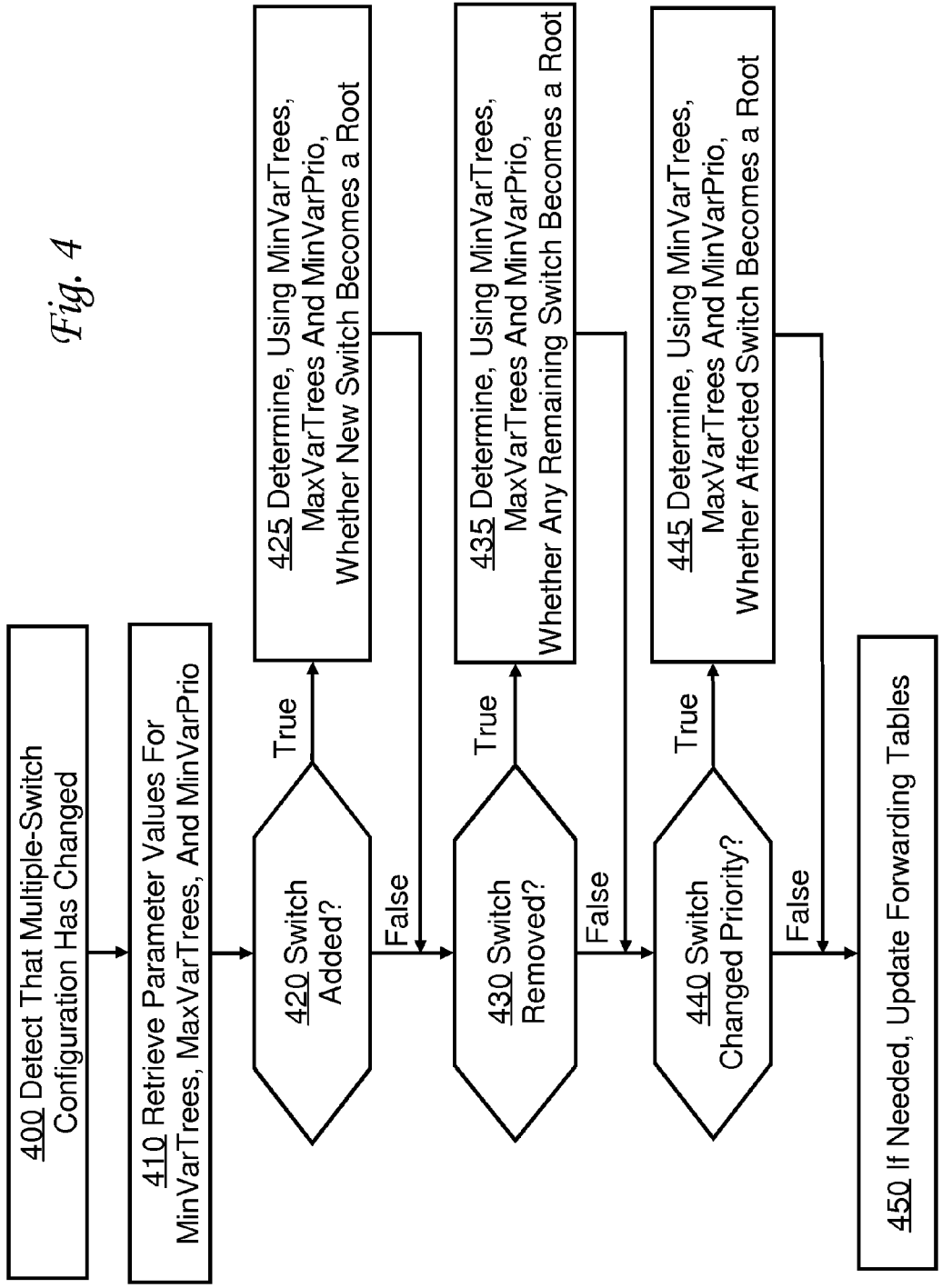
FIG. 4 illustrates an example method for determining multicast roots in a telecommunications network.

FIG. 4 illustrates an example method for determining multicast roots in a telecommunications network. In step 400, it is detected that a multiple-switch configuration in a data communications network has changed. For example, it may be detected that a new switch has been added to the network, that a switch has been removed from the network configuration, that a priority class value has changed for a switch, or some other changes in functionalities of a switch has been made.

In step 410, values of various parameters are retrieved. For example, the values of MinVarTrees, MaxVarTrees, and MinVarPrio may be retrieved. The values may be retrieved by a switch from the switch database, data repository or other storage accessible to the switch.

In step 420, it is determined whether the change pertains to adding a new switch to a network fabric. A switch may be added when a new switch is installed, booted or otherwise included in the network configuration.

If the change pertains to adding a switch to the network, then the process proceeds to executing step 425. Otherwise, the process proceeds to executing step 430.

In step 425, it is determined whether a newly added switch may become a tree-root. The determination may be made using the values of the parameters such as MinVarTrees, MaxVarTrees and MinVarPrio. Additional information used in determining whether the newly added switch may be a tree-root may include the information specific to the newly added switch, such as a priority class value of the switch, and the information specific to the current configuration of the network, such as the types of different switches, the quantity of spine switches and the quantity of edge switches. Further, in determining whether the newly added switch may be a tree-root, the rules described above, such as Rules 1A-1C, or other rules may be applied.

In step 430, it is determined whether the change pertains to removing a switch from a network fabric. A switch may be removed from the network if the switch fails, or its own configuration is modified to cause the switch become unreachable.

If the change pertains to removing a switch from the network, then the process proceeds to executing step 435. Otherwise, the process proceeds to executing step 440.

In step 435, it is determined whether, after a switch is removed, any change may be made to a set of tree-roots. The determination may be made using the values of the parameters such as MinVarTrees, MaxVarTrees, MinVarPrio, priority class values of the remaining switches, information specific to the current configuration of the network, such as the type of different switches, the quantity of spine switches and the quantity of edge switches. Further, in determining whether, after a switch was removed, a set of tree-roots may be modified various rules, such as Rules 2A-2B, or others may be applied.

In step 440, it is determined whether the change pertains to changing a priority class value of a switch in the network. A priority of the switch may be increased or decreased, and the change may be caused by changing a configuration of the switch.

If the change pertains to a priority class value change of a switch, then the process proceeds to executing step 445. Otherwise, the process proceeds to executing step 450.

In step 445, it is determined whether, after a priority class value change of a switch, any change may be made to a set of tree-roots. The determination may be made using the values of the parameters such as MinVarTrees, MaxVarTrees, MinVarPrio, information such as a priority class value of the switches, and the information specific to the current configuration of the network, such as the type of different switches, the quantity of spine switches and the quantity of edge switches. Further, various rules, such as Rules 3A-3B, or others may be used in making the determination.

In step 450, the process determines whether any changes to forwarding tables are to be made. For example, if upon adding a new switch, the newly added switch becomes a tree-root, then the process may update the set of tree-roots by adding the information about the newly added switch. According to another example, if upon removing a particular switch that acted as a tree-root, some other switch becomes a tree-root, then the process may update the set of tree-roots by updating the tree-root information in the set accordingly. Also, if upon changing a priority class value of a particular switch that switch became a tree-root, the process may update the set of tree-roots by adding the information indicating that the particular switch became a tree-root.

Hardware Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
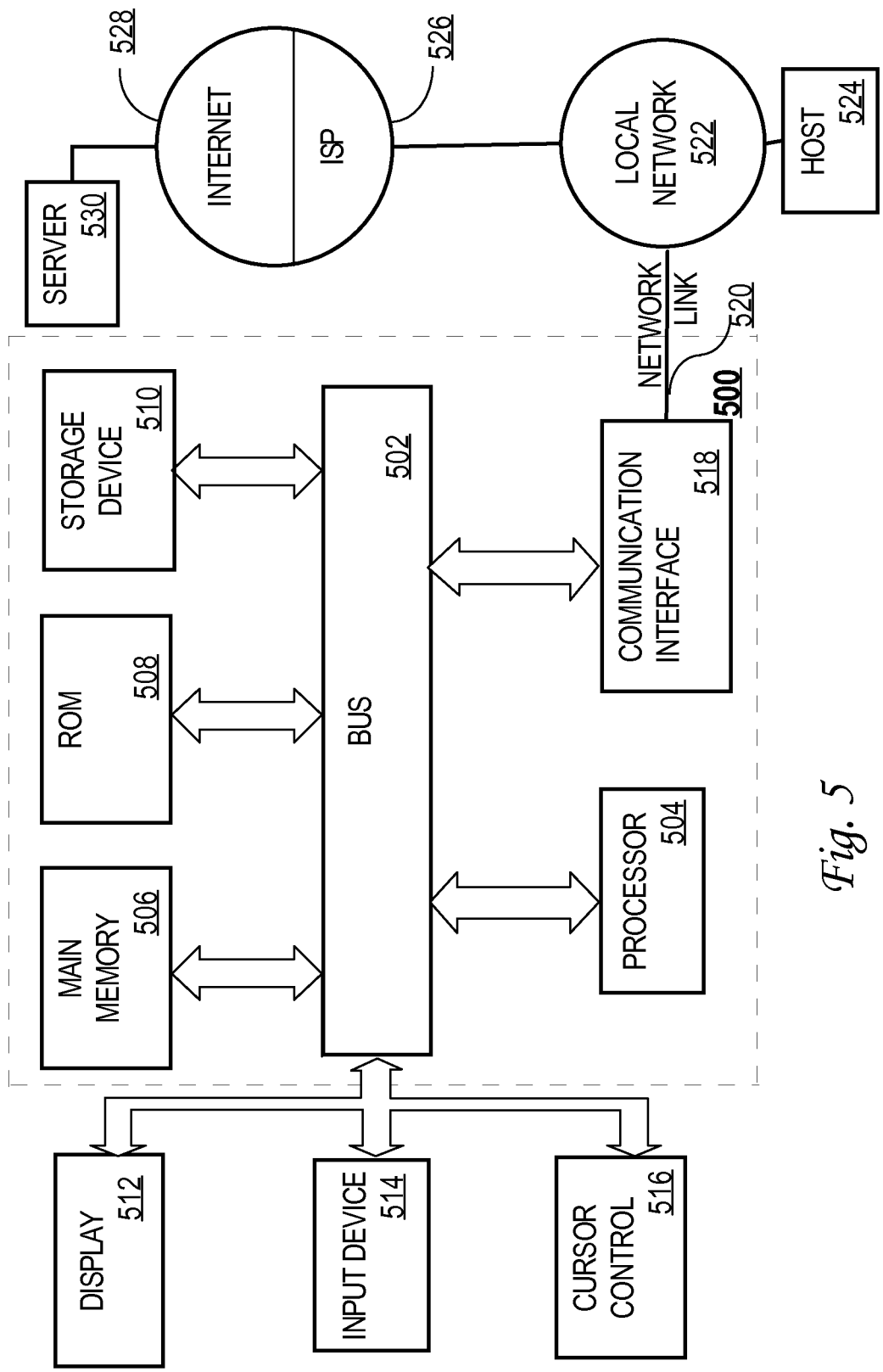
FIG. 5 illustrates an example computer system with which an embodiment may be implemented.

For example, FIG. 5 illustrates an example computer system 500 with which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (LCD, CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
  detecting a change in a multiple-switch configuration in a data communications network comprising a plurality of packet data switches configured as roots of multicast trees;
  in response to detecting that the multiple-switch configuration has changed:
  retrieving a first value, a second value and a third value, wherein the first value and the second value represent limits on a number of multicast trees supported in the network and the third value indicates a minimum priority value to cause a node having the minimum priority value to become eligible to be a root;

determining a type of the multiple-switch configuration change;

in response to determining that the type indicates that a first switch was added to the multiple-switch configuration, determining, using at least the first, second and third values, whether to configure the first switch as a first root in the multiple-switch configuration;

wherein the method is performed by one or more computing devices.

2. The method of claim 1, further comprising:

in response to determining that the type indicates that a second switch was removed from the multiple-switch configuration, determining, using at least the first, second and third values, whether to configure a remaining switch of the multiple-switch configuration as a second root.

3. The method of claim 2, further comprising:

in response to determining that the type indicates that a third priority of a third switch in the multiple-switch configuration has changed, determining, using at least the first, second and third values, whether to configure the third switch as a third root in the multiple-switch configuration.

4. The method of claim 3, wherein:

the first value indicates a maximum quantity of multicast trees that the network supports;

the second value indicates a minimum quantity of the multicast trees that the network supports;

the third value indicates the minimum priority value used to determine whether a particular node becomes a particular root and is not lesser than an edge default priority value and not greater than a core default priority value.

5. The method of claim 3, further comprising:

in response to determining to configure the first root, the second root or the third root, updating data in one or more forwarding tables of the switches.

6. The method of claim 1, further comprising configuring the first switch as the first root in response to determining that a current quantity of roots in the multiple-switch configuration is lesser than the first value, or in response to determining that the current quantity of roots is not lesser than the first value, but a first priority associated with the first switch is higher than any priority of any node in a current set of roots, or in response to determining that the current quantity of roots is lesser than the second value and the first priority associated with the first switch is greater than the third value.

7. The method of claim 2, further comprising configuring the remaining switch of the multiple-switch configuration as the second root in response to determining that a current quantity of roots in the multiple-switch configuration is no greater than the first value and a second priority of the remaining switch is not lower than the third value, or in response to determining that the current quantity of roots in the multiple-switch configuration is lesser than the first value and the second priority of the remaining switch is higher than any other priority of any other root in a current set of roots.

8. The method of claim 3, further comprising retaining a configuration of the third switch of the multiple-switch configuration as the third root in response to determining that the third switch belongs to a current set of roots and the third priority is not lower than the third value;

further comprising configuring the third switch of the multiple-switch configuration as the third root in response to determining that the third switch did not belong to the current set of roots, the third priority is greater than the third value and there was at least one node in the current set of roots with a priority lower than the third value, or in response to determining that the third switch did not belong to the current set of roots, the third priority is greater than the third value and a current quantity of roots in the multiple-switch configuration is lesser than the second value.

9. The method of claim 3, wherein:

the first value indicates a maximum quantity of multicast trees that the network supports;

the second value indicates a minimum quantity of the multicast trees that the network supports;

the third value indicates any one of: a priority class value of the first switch, types of switches in the network, a quantity of spine switches in the network, a quantity of edge switches in the network.

10. A non-transitory computer-readable storage medium storing one or more sequences of instructions which, when executed by one or more processors, cause the one or more processors to perform:

detecting a change in a multiple-switch configuration in a data communications network comprising a plurality of packet data switches configured as roots of multicast trees;

in response to detecting that the multiple-switch configuration has changed:

retrieving a first value, a second value and a third value, wherein the first value and the second value represent limits on a number of multicast trees supported in the network, and the third value indicates a minimum priority value to cause a node having the minimum priority value to become eligible to be a root;

determining a type of the multiple-switch configuration change;

in response to determining that the type indicates that a first switch was added to the multiple-switch configuration, determining, using at least the first, second and third values, whether to configure the first switch as a first root in the multiple-switch configuration.

11. The non-transitory computer-readable storage medium of claim 10, further storing instructions which, when executed, cause the one or more processors to perform:

in response to determining that the type indicates that a second switch was removed from the multiple-switch configuration, determining, using at least the first, second and third values, whether to configure a remaining switch of the multiple-switch configuration as a second root.

12. The non-transitory computer-readable storage medium of claim 11, further storing instructions which, when executed, cause the one or more processors to perform:

in response to determining that the type indicates that a third priority of a third switch in the multiple-switch configuration has changed, determining, using at least the first, second and third values, whether to configure the third switch as a third root in the multiple-switch configuration.

13. The non-transitory computer-readable storage medium of claim 12, wherein:

the first value indicates a maximum quantity of multicast trees that the network supports;

the second value indicates a minimum quantity of the multicast trees that the network supports;

the third value indicates the minimum priority value used to determine whether a particular node becomes a particular root and is not lesser than an edge default priority value and not greater than a core default priority value.

14. The non-transitory computer-readable storage medium of claim 12, further storing instructions which, when executed, cause the one or more processors to perform:

in response to determining to configure the first root, the second root or the third root, updating data in one or more forwarding tables of the switches.

15. The non-transitory computer-readable storage medium of claim 11, further comprising instructions which, when executed, cause the one or more processors to perform: configuring the remaining switch of the multiple-switch configuration as the second root in response to determining that a current quantity of roots in the multiple-switch configuration is no greater than the first value and a second priority of the remaining switch is not lower than the third value, or in response to determining that the current quantity of roots in the multiple-switch configuration is lesser than the first value and the second priority of the remaining switch is higher than any other priority of any other root in a current set of roots.

16. The non-transitory computer-readable storage medium of claim 12, further comprising instructions which, when executed, cause the one or more processors to perform: retaining a configuration of the third switch of the multiple-switch configuration as the third root in response to determining that the third switch belongs to a current set of roots and the third priority is not lower than the third value; configuring the third switch of the multiple-switch configuration as the third root in response to determining that the third switch did not belong to the current set of roots, the third priority is greater than the third value and there was at least one node in the current set of roots with a priority lower than the third value, or in response to determining that the third switch did not belong to the current set of roots, the third priority is greater than the third value and a current quantity of roots in the multiple-switch configuration is lesser than the second value.

17. The non-transitory computer-readable storage medium of claim 12, wherein:

the first value indicates a maximum quantity of multicast trees that the network supports;

the second value indicates a minimum quantity of the multicast trees that the network supports;

the third value indicates any one of: a priority class value of the first switch, types of switches in the network, a quantity of spine switches in the network, a quantity of edge switches in the network.

18. A packet data switch comprising:

one or more processors;

one or more non-transitory data storage media coupled to the one or more processors and storing sequences of instructions which, when executed using the one or more processors, cause performing:

detecting that a multiple-switch configuration in a network has changed;

detecting a change in the multiple-switch configuration in a data communications network comprising a plurality of packet data switches configured as roots of multicast trees;

in response to detecting that the multiple-switch configuration has changed:

retrieving a first value, a second value and a third value representing limits on a number of multicast trees supported in the network and prioritization of the switches;

determining a type of the multiple-switch configuration change;

in response to determining that the type indicates that a first switch was added to the multiple-switch configuration, determining, using at least the first, second and third values, whether to configure the first switch as a first root in the multiple-switch configuration;

wherein the first value and the second value represent limits on the number of multicast trees that the network supports; wherein the third value indicates a minimum priority value to cause a node having the minimum priority value to become eligible to be a root.

19. The packet data switch of claim 18, storing additional instructions which, when executed using the one or more processors, cause: in response to determining that the type indicates that a second switch was removed from the multiple-switch configuration, determining, using at least the first, second and third values, whether to configure a remaining switch of the multiple-switch configuration as a second root.

20. The packet data switch of claim 19, storing additional instructions which, when executed using the one or more processors, cause: in response to determining that the type indicates that a third priority of a third switch in the multiple-switch configuration has changed, determining, using at least the first, second and third values, whether to configure the third switch as a third root in the multiple-switch configuration.

21. The packet data switch of claim 20, storing additional instructions which, when executed using the one or more processors, cause:

configuring the first switch as the first root in response to determining that a current quantity of roots in the multiple-switch configuration is lesser than the first value, or in response to determining that the current quantity of roots is not lesser than the first value, but a first priority associated with the first switch is higher than any priority of any node in a current set of roots, or in response to determining that the current quantity of roots is lesser than the second value and the first priority associated with the first switch is greater than the third value;

configuring the remaining switch of the multiple-switch configuration as the second root in response to determining that a current quantity of roots in the multiple-switch configuration is no greater than the first value and a second priority of the remaining switch is not lower than the third value, or in response to determining that the current quantity of roots in the multiple-switch configuration is lesser than the first value and the second priority of the remaining switch is higher than any other priority of any other root in a current set of roots;

retaining a configuration of the third switch of the multiple-switch configuration as the third root in response to determining that the third switch belongs to a current set of roots and the third priority is not lower than the third value;

configuring the third switch of the multiple-switch configuration as the third root in response to determining that the third switch did not belong to the current set of roots, the third priority is greater than the third value and there was at least one node in the current set of roots with a priority lower than the third value, or in response to determining that the third switch did not belong to the current set of roots, the third priority is greater than the third value and a current quantity of roots in the multiple-switch configuration is lesser than the second value.

\* \* \* \* \*